United States Patent
Chen et al.

(10) Patent No.: US 10,268,714 B2
(45) Date of Patent: Apr. 23, 2019

(54) DATA PROCESSING IN DISTRIBUTED COMPUTING

(71) Applicant: International Business Machines Corporation, Armonk, NY (US)

(72) Inventors: Lei Chen, Shanghai (CN); Yue Hu, Shanghai (CN); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 14/927,918

(22) Filed: Oct. 30, 2015

(65) Prior Publication Data
US 2017/0124129 A1    May 4, 2017

(51) Int. Cl.
*G06F 17/30*    (2006.01)

(52) U.S. Cl.
CPC .. *G06F 17/30321* (2013.01); *G06F 17/30545* (2013.01)

(58) Field of Classification Search
CPC ................................................ G06F 17/30545
See application file for complete search history.

(56) References Cited

U.S. PATENT DOCUMENTS

| | | | |
|---|---|---|---|
| 7,516,132 B1* | 4/2009 | Fast | H04L 67/1095 |
| 8,190,610 B2 | 5/2012 | Dasdan et al. | |
| 8,533,732 B2 | 9/2013 | Morich et al. | |
| 2004/0230742 A1 | 11/2004 | Ikeuchi et al. | |
| 2011/0154339 A1 | 6/2011 | Lee et al. | |
| 2014/0052965 A1 | 2/2014 | Sarel | |
| 2014/0108415 A1 | 4/2014 | Bulkowski et al. | |
| 2014/0136779 A1 | 5/2014 | Guha et al. | |
| 2016/0098472 A1* | 4/2016 | Appleton | G06F 17/30424 707/737 |

FOREIGN PATENT DOCUMENTS

| | | |
|---|---|---|
| GB | 2516357 A | 1/2015 |
| WO | 2015026446 A1 | 2/2015 |

OTHER PUBLICATIONS

Rafique, et al., "CellMR: A Framework for Supporting MapReduce on Asymmetric Cell-Based Clusters", 2009, pp. 1-12.
Ren, et al., "Otus: Resouce Attribution in Data-Intensive Clusters", MapReduce '11, Jun. 8, 2011, Copyright 2011, pp. 1-8.
Zaharia, et al., "Improving MapReduce Performance in Heterogeneous Environments", Printed Jun. 12, 2015, pp. 1-24, <https://www.usenix.org/legacy/event/osdi08/tech/full_paper/zharia_html/index.html>.
"3.3.1. YARN Overview"; Printed Jun. 10, 2015, pp. 1-3, <http://docs.hortonworks.com/HDPDocuments/HDP2/HDP-2.1.15/bk_using-apache-hadoop/content/yarn_oveerview.html>.

* cited by examiner

*Primary Examiner* — Kris E Mackes
(74) *Attorney, Agent, or Firm* — Edward J. Wixted, III (57) ABSTRACT

In an approach for processing a data block, a processor determines a first performance index of a first data node, wherein a first copy of the data block is stored on the first data node, wherein the first copy of the data block is a portion included in a data object. A processor determines a second performance index of a second data node, wherein a second copy of the data block is stored on the second data node. A processor processes the first copy of the data block using a MAP algorithm in response to the first performance index being greater than, according to a predefined threshold, the second performance index. A processor generates a processed result of the data object using a REDUCE algorithm based on, at least, the processed first copy of the data block.

14 Claims, 5 Drawing Sheets

```
REMAINING TIME = PREDEFINED PERIOD;
CURRENT DATA BLOCK = THE FIRST DATA BLOCK ON THE DATA NODE;
ESTIMATED DURATION = TIME ESTIMATED FOR PROCESSING EACH DATA BLOCK BY
THE DATA NODE;

WHILE REMAINING TIME ≥ ESTIMATED DURATION
    AND CURRENT DATA BLOCK ≠ NULL
{
    PROCESSING CURRENT DATA BLOCK;
    REMAINING TIME = REMAINING TIME − ESTIMATED DURATION;
    CURRENT DATA BLOCK = A NEXT DATA BLOCK ON THE DATA NODE;
}
```

DATA PROCESSING IN DISTRIBUTED COMPUTING

BACKGROUND

With the development of distributed data storage technology, a data storage system is no longer limited to being locally deployed on a single storage device, but may be disposed at any physical position that is accessible to a user via a network. Meanwhile, a large data object may be divided into small data blocks and then stored on multiple storage devices. Further, multiple copies of each data block of the data object may be stored on different devices so as to increase the reliability of the storage system. In a distributed data storage system, if one storage device crashes, the copy stored on the crashed storage device may be recovered from other storage devices.

Data distribution among multiple storage devices is also important for distributed data processing. In the distributed data storage system, data processing is not limited to being implemented on a single device. Instead, each small data block may be processed at its local device utilizing the computing power of the local storage device. Each small data block may be processed at a corresponding local device, and then the processed result of each small data block may be integrated into a final result.

SUMMARY

Aspects of an embodiment of the present invention disclose a method, computer program product, and computing system for processing a data block. A processor determines a first performance index of a first data node, wherein a first copy of the data block is stored on the first data node, wherein the first copy of the data block is a portion included in a data object. A processor determines a second performance index of a second data node, wherein a second copy of the data block is stored on the second data node. A processor processes the first copy of the data block using a MAP algorithm in response to the first performance index being greater than, according to a predefined threshold, the second performance index. A processor generates a processed result of the data object using a REDUCE algorithm based on, at least, the processed first copy of the data block.

DETAILED DESCRIPTION

Embodiments of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
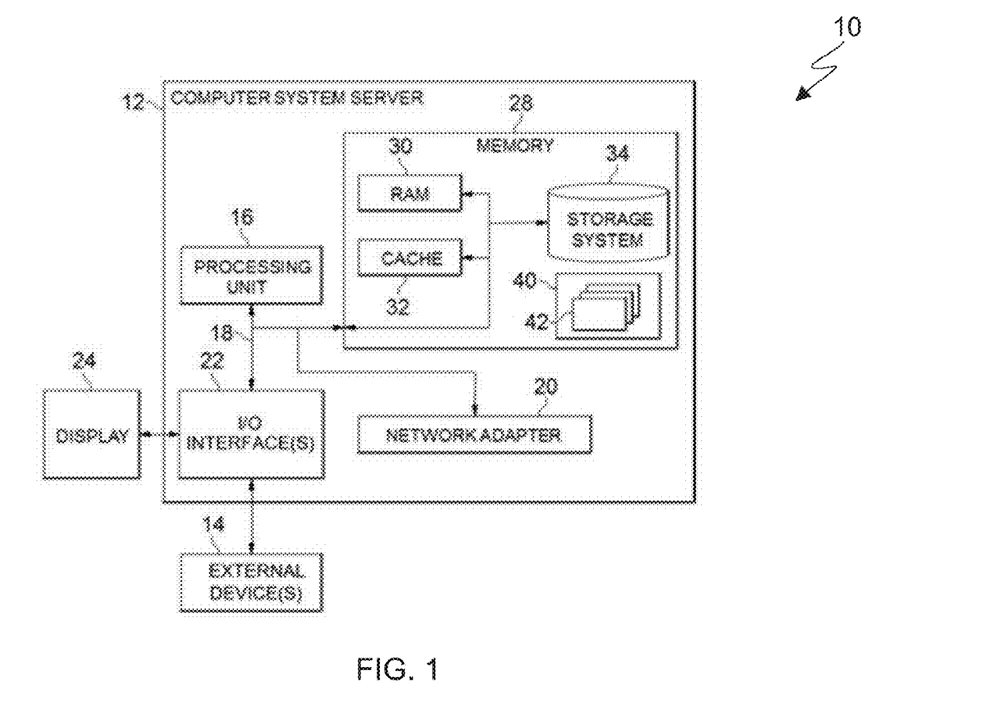
FIG. 1 illustrates a cloud computing node according to one embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
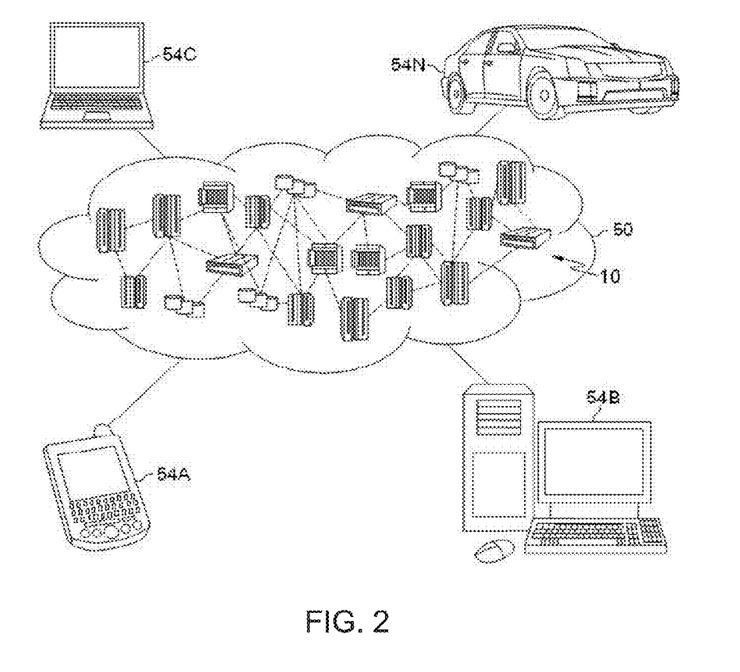
FIG. 2 illustrates a cloud computing environment according to one embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
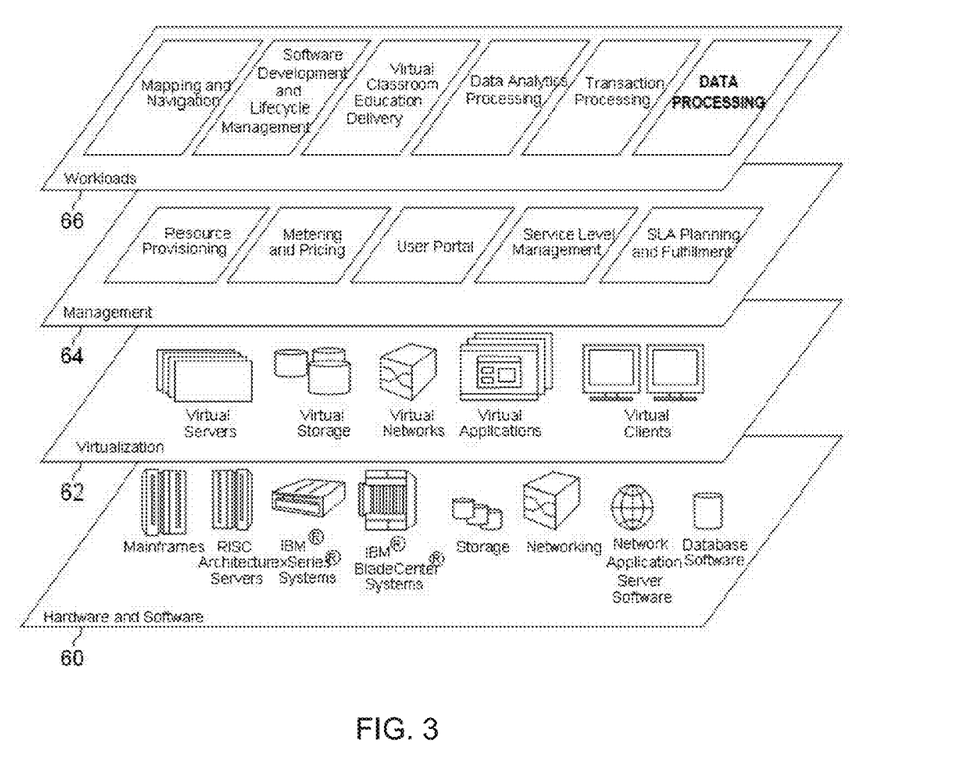
FIG. 3 illustrates abstraction model layers according to one embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; servers; blade servers; storage devices; and networks and networking components. In some embodiments, software components include network application server software and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data processing.

Some embodiments of the present invention will be discussed. In general, embodiments may balance the workloads among the multiple devices in a distributed storage system, which can significantly improve the distributed computing and parallelization of the computing procedures among multiple devices in the distributed storage system. Moreover, embodiments of the present invention can take full advantage of the resources of the devices on which the multiple copies of the data blocks are stored.

Figure 4:
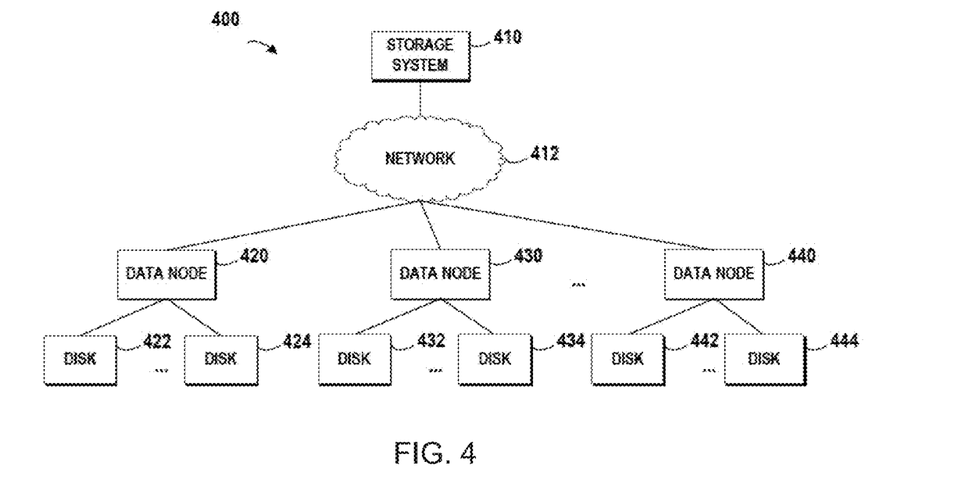
FIG. 4 illustrates an example storage system in which one embodiment of the present invention may be implemented.

FIG. 4 illustrates an example storage system 400 in which one embodiment of the present invention may be implemented. As illustrated in FIG. 4, distributed storage system 410 is distributed among a data node 420, a data node 430, . . . , and a data node 440 via a network 412. Each of these data nodes comprises a plurality of disks. For instance, in the shown example, the data node 420 comprises a disk 422, . . . , and a disk 424; the data node 430 comprises a disk 432, . . . , and a disk 434; and the data node 440 comprises a disk 442, . . . , and a disk 444. It should be noted that, in embodiments of the present invention, any number of data nodes, and disks on each respective data node, may be present.

It would be appreciated that the present invention is not limited to the physical locations of the data nodes and the disks as illustrated in FIG. 4. These data nodes may be located at same or different physical locations. For example, the data node 420 may be located at a data center in City A, while the data node 430 may be located at another data center in a different City B. Further, the embodiments of the present invention can be implemented in connection with any types of data nodes. In one embodiment, for example, one or more data nodes may be implemented by storage servers comprising multiple physical disks. Alternatively, or in addition, one or more data nodes may be implemented by virtual storage servers comprising multiple virtual storage disks.

The distributed storage system 410 in FIG. 4 may provide higher data storage capacity and increased data reliability for the user. For example, a single storage device may not provide space for holding a huge data object (for example, 100 Gigabyte). With the above distributed storage system, the data object may be divided into multiple data blocks (for example, each data block may be of 1 Gigabyte). Then the 100 data blocks may be distributed among a plurality of data nodes, with each data node storing one or more data blocks.

Usually, more than one copy of the data object may be stored in order to deal with a crash in the distributed storage system, and the data blocks of each copy may be distributed among multiple data nodes. For example, when two copies of the data object are stored in the distributed storage system 410, the data blocks 1-100 of the first copy may be stored on the data node 420, and the data blocks 1-100 of the second copy may be stored on the data node 430. Further, in a traditional Hadoop® storage system, three copies of the data object may be stored. For example, each of the data nodes 420, 430, and 440 may hold one copy of the data object.

With respect to data processing in a distributed storage system, some approaches have been proposed for distributed computing and parallelizing the computing process among multiple nodes in the distributed storage system. In distributed computing, each data block in the data object is retrieved from the local disk and then is processed to obtain a temporary result. After that, the temporary results of all the data blocks in the data object are further integrated into a final result.

With such conventional approaches, although data blocks may be processed on different data nodes in parallel, processing the data block may result in additional resources cost on the data node beside the normal resource consumption. In other words, once a data node with heavy workload is assigned to process a data block stored thereon, the processing would probably be delayed due to shortage of processing resource. Specifically, the performance of the data node depends on various factors. For example, the Input/Output (I/O) performance of the data node may vary according to the available I/O bandwidth of the data node, which may depend on the total bandwidth and the current occupied I/O bandwidth of the disk of the data node. Accordingly, the available I/O bandwidth should be considered before assigning the data node. On the other hand, the data object has several copies (for example, three copies in a Hadoop® system) in the distributed storage system, however, embodiments of the present invention recognize that current approaches fail to take full advantage of the resources of the data nodes on which the different copies are stored. As a result, the time cost for processing the data object according to the proposed approaches depends on the weakest data node, thereby a low efficiency in processing the data object may be caused.

In view of the above, one embodiment of the present invention proposes a computer-implemented method. In the method, a first performance index of a first data node is determined, where a first copy of a data block is stored on the first data node. Then, a second performance index of a second data node is determined, where a second copy of the data block is stored on the second data node. Next, the first copy of the data block is processed by the first data node in response to the first performance index being greater than the second performance index based on a predefined threshold.

As multiple copies of the data block in the data object are stored on a plurality of data nodes in the distributed storage system, according to embodiments of the present invention, the performances (for example, the I/O performance and the CPU (Central Processing Unit) performance) of different data nodes on which copies of the same data block in the data object are stored are compared. Then a "powerful" data node with a better performance is selected from these data nodes for processing the data block. In this way, the data block in the data object may be processed with higher efficiency. Further, data blocks in the data object may be processed by multiple data blocks in parallel and thus the total data object may be processed more quickly.

It would be appreciated that although the I/O performance and the CPU performance are taken as example performance in describing the embodiments of the present invention, another type of performance may be adopted in another embodiment of the present invention. For example, if the time for accessing the memory in the data node cannot be neglected, then the memory performance may be considered. The performance described in the present invention may include but not limited to the above aspects that can affect the performance of the data node. Further, each of the above aspects may be considered individually or multiple aspects may be combined in the embodiments of the present invention. Moreover, the above aspects of the performance may be considered according to a predefined priority.

Figure 5:
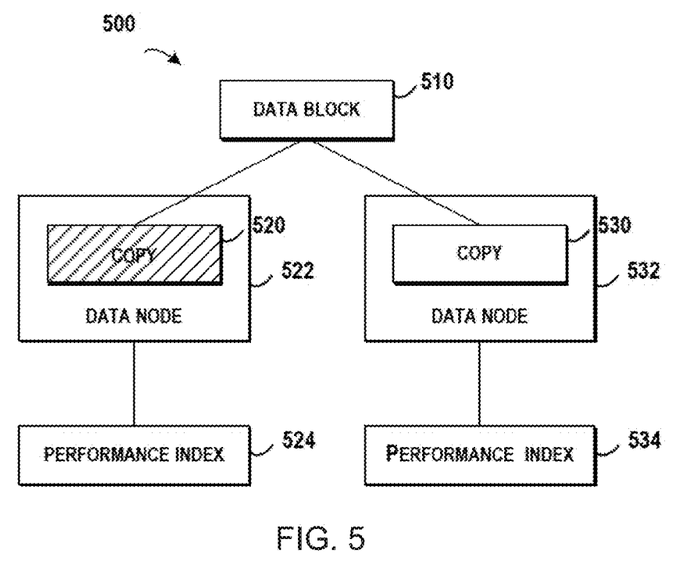
FIG. 5 illustrates a block diagram for processing one copy of the data block according to one embodiment of the present invention.

FIG. 5 schematically illustrates a block diagram 500 for processing one copy of the data block according to one embodiment of the present invention. In FIG. 5, the data block 510 may be one data block included in a data object. Although the data object may comprise a plurality of data blocks (for example, for the above data object of 100 Gigabytes, it may include 100 data blocks of 1 Gigabyte), only one of these data blocks is illustrated in FIG. 5 for simplicity. With the data block 510 as an example, the principle of the present invention will be described hereinafter. Other data blocks in the data object may be processed in a similar way.

Two copies of the data block 510 are stored on two data nodes, respectively. One copy 520 of the data block 510 is stored on a data node 522, and another copy 530 of the data block 510 is stored on a data node 532. In this embodiment, the performance index 524 of the data node 522 and the performance index 534 about the data node 532 may be determined. The performance index acts as a metric for measuring the performance of the data node 522 and the data node 532. As the copy 520 and the copy 530 are both copied from the same data block 510, only one of these copies needs to be processed. In this example, only the copy 520 in the shaded box is processed. Next, the performance indexes 524 and 534 are compared and the data node with a better performance is selected to process the copy stored thereon. As illustrated in FIG. 5, if the performance index 524 indicates a better performance, then the data node 522 may be selected to process the copy 520.

It would be appreciated that although FIG. 5 illustrates only two data nodes for respectively storing two copies of the data block, in other embodiments, there may be more data nodes for storing multiple copies of one data block. For example, in the Hadoop® storage system, each data block may have three copies separately stored on three data nodes. In the Hadoop® storage system, the performance indexes of the three data nodes may be compared, and then one data node with the best performance may be select to process a copy of the data block stored thereon. Moreover, although only one data block is illustrated in FIG. 5, in another embodiment, another data block in the data object may be likewise processed in parallel with the data block 510. In other words, different data blocks in the data object may be processed in parallel.

Figure 6:
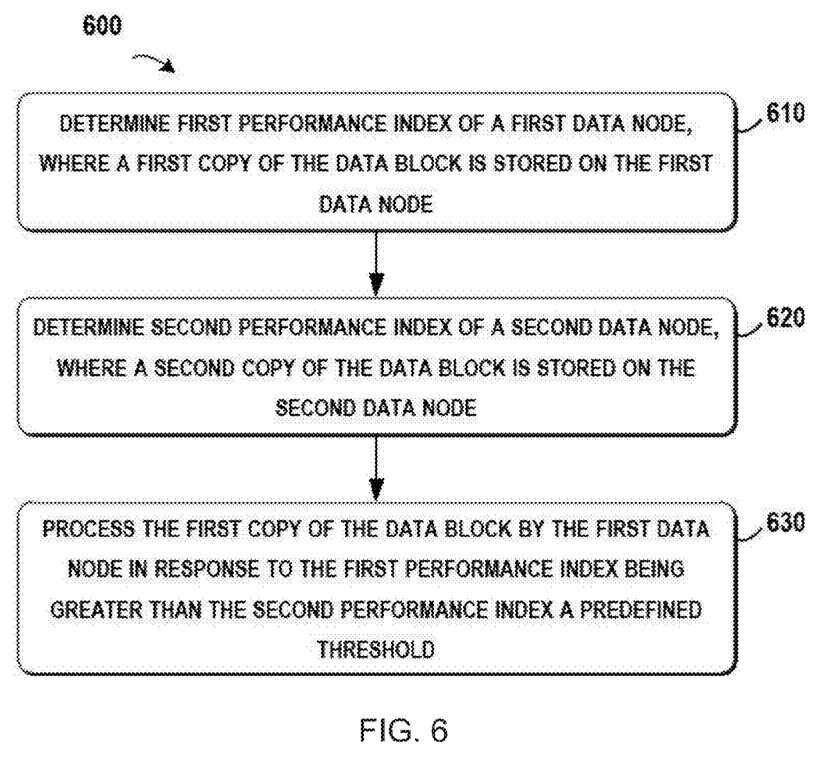
FIG. 6 illustrates a flowchart for processing one copy of the data block according to one embodiment of the present invention.

FIG. 6 schematically illustrates a flowchart 600 for processing one copy of the data block according to one embodiment of the present invention. In Step 610, a first performance index of a first data node is determined, where a first copy of a data block is stored on the first data node. Then in Step 620, a second performance index of a second data node is determined, where a second copy of the data block is stored on the second data node. As described above, a first copy of a data block is stored on the first data node and a second copy of the data block is stored on the second data node.

In Steps 610 and 620, the performance indexes of the first and second data nodes may be determined from various aspects. For example, as data processing usually depends on the time duration for reading the data and the time duration for calculating a result from the data, the performance index may comprise an I/O performance and a CPU performance. Other performance metrics can be used as well.

In Step 630, the first copy of the data block is processed by the first data node in response to the first performance index being greater than the second performance index based on a predefined threshold. In this step, the first and second performance indexes may be compared and the data node with a better performance may be selected to process the copy stored thereon. For example, if the first performance index is greater than the second performance index based on a predefined threshold, then the first data node is selected to process the first copy.

For example, the I/O performance may be measured by an available I/O resource of the disk in the data node, and the CPU performance may be measured by an available CPU resource of the CPU in the data node. As the first and second data nodes may be equipped with different types of disks and CPUs, the performance indexes of the first and second data nodes may be normalized to a uniform format for further comparison.

In one embodiment of the present invention, the CPU performance may be measured. The CPUs of the data nodes are usually made by different providers and have different types. Generally, the computing power of a CPU may depend on the frequency of the core in the CPU, the number of the cores provided in the CPU, and the usage of the CPU. Accordingly, the CPU performance may be measured from the above aspects. For example, features of a first and a second CPU are illustrated in Table 1 as below:

TABLE 1

Features of CPUs

| Feature | CPU 1 | CPU 2 |
|---|---|---|
| Frequency | 2 GHz | 1 GHz |
| Number of Cores | 4 | 2 |
| Usage | 20% | 60% |

In the context of the present invention, a benchmark may be defined for measuring the CPU performance. For example, a CPU with a frequency of 1 GHz, 1 core and a usage of 0% may be defined as a benchmark. The CPU performance of the data node may be calculated based on the frequency, the number of the cores and the usage. For example, in one embodiment, the following Equation (1) may be adopted.

$$CPU(\text{data node}) = \frac{\text{frequency}}{1 \text{ GHz}} \times \frac{\text{number of cores}}{1} \times \frac{1 - \text{usage rate}}{100\%} \quad (1)$$

Accordingly, the performance indexes of the first and second data nodes may be represented as:

$$CPU(\text{data node 1}) = \frac{2}{1} \times \frac{4}{1} \times \frac{1 - 20\%}{100\%} = 6.4$$

$$CPU(\text{data node 2}) = \frac{1}{1} \times \frac{2}{1} \times \frac{1 - 60\%}{100\%} = 0.8$$

In the above example, CPU (data node 1)>CPU (data node 2), then it is determined that the performance of the data node 1 is better than that of the data node 2. Accordingly, the data node 1 may be selected to process the first copy stored on it.

In one embodiment of the present invention, if the CPU performance of the first and second data nodes is identical, then the I/O performance of the disk on which the copy is stored may be considered. In this embodiment, the first copy is stored on a first disk in the first data node and the second copy is stored on a second disk in the second data node. The first performance index may further comprise a first IO performance indicating an available bandwidth of the first disk, and the second performance index may further comprise a second IO performance indicating an available bandwidth of the second disk.

Usually, the disks comprised in the data node may relate to different interface types. For example, Integrated Drive Electronics (IDE) disks, Small Computer System Interface (SCSI) disks, Serial ATA (SATA) disks, Solid-State Disk (SSD) and the like may be provided in the data node. Each interface type may have a base I/O bandwidth. In the context of the present invention, the available I/O bandwidth depends on the interface type of the disk as well as the occupied bandwidth. Accordingly, the available I/O bandwidth may be estimated based on the basic bandwidth and the occupied bandwidth as below:

$$IO(\text{data node}) = \text{Bandwidth}_{base} - \text{Bandwidth}_{occupied} \quad (2)$$

For example, the base bandwidth of the SATA disk may be 200 MB/s and the base bandwidth of the SSD may be 550 MB/s. Continuing the above example, it is supposed that the first copy of the data block is stored on a first disk (SSD type, with a occupied bandwidth of 100 MB/s) in the first data node, and the second copy of the data block is stored on a second disk (SATA type, with a occupied bandwidth of 100 MB/s) in the second data node. In this event, the available I/O bandwidth of the first and second data nodes may be calculated as below:

IO(data node 1)=550−100=450 MB/s

IO(data node 2)=200−100=100 MB/s

Since IO (data node 1)>IO (data node 2) in this example, the first data node may be selected to process the first copy of the data block.

In one embodiment of the present invention, performance histories of the first and second data nodes may be collected so as to determine the first and second performance indexes. For example, from the data log recording the performance of the data node in a previous month, the CPU usage may be collected periodically. The CPU performance may be determined by averaging the CPU usage collected from the data log. For a certain time point (for example, 10:00 AM), the CPU usage may be calculated by averaging the sum of the CPU usage collected at 10:00 AM at each day of the previous time period by Equation (3) as below.

$$CPU \text{ usage}(10:00) = \sum_{i=1}^{N} \frac{\text{rate}_i}{N} \quad (3)$$

Where N represents the number of the days in the previous time period.

By collecting the CPU usage at a predefined interval, CPU usage of each data node may be determined based on the above Equation (3). Next, based on the above Equation (1), CPU performance of each data node may be obtained. Similarly, I/O performance of each data node may be obtained and details of it are omitted herein.

Figure 7A:
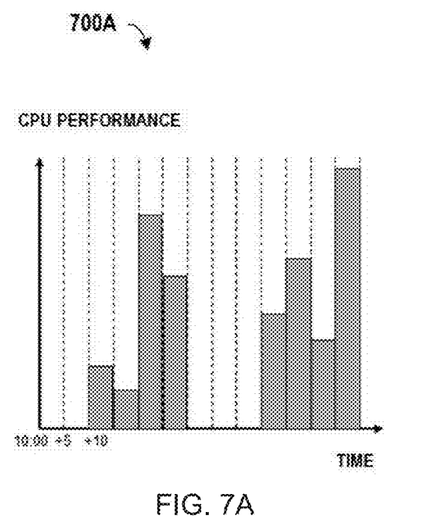
FIG. 7A illustrates an example of the performance index according to one embodiment of the present invention.
Figure 7B:
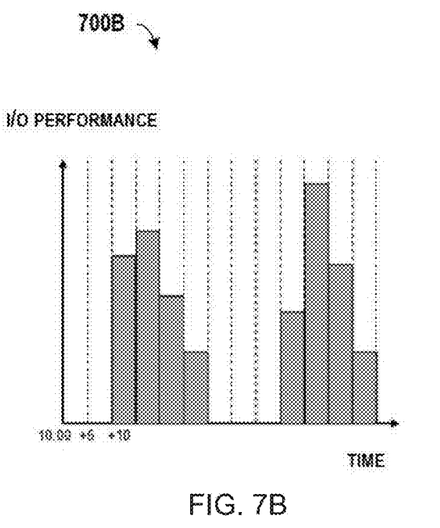
FIG. 7B illustrates an example of the performance index according to one embodiment of the present invention.

FIG. 7A illustrates an example 700A of the CPU performance of one data node according to one embodiment of the present invention, and FIG. 7B illustrates an example 700B of the I/O performance of one data node according to one embodiment of the present invention. In FIG. 7A, the horizontal axis indicates the time and the vertical axis indicates the CPU performance of the data node. The CPU performance at various time points illustrated in FIG. 7A is obtained based on the above Equation (1) and (3). With FIG. 7A, the CPU performance at any specific time point may be obtained, and thus in comparing the CPU performance indexes of the first and second data nodes, the data node with a better CPU performance may be selected.

In one embodiment of the present invention, a period may be predefined in processing the data block. For example, the period may be defined as 10 minutes, 20 minutes or any other suitable value. From the performance index, efficiency of the data node within the predefined period may be predicted. Specifically, a first efficiency of the first data node within the predefined period may be predicted according to the first performance index, and a second efficiency of the second data node within the predefined period may be predicted according to the second performance index.

The efficiency of the data node may be predicted in a variety of ways. For example, the CPU performance at the starting of the predefined period may be directly used as the efficiency. For another example, the average of the CPU performance within the predefined period may be used as the efficiency. In the example discussed above, if the CPU performance of the data nodes 1 and 2 during 10:00-10:10 AM is 6.4 and 0.8 respectively, then the data node 1 may be selected to process the copy stored on the data node 1 during 10:00-10:10 AM. For a next period 10:10-10:20 AM, if the CPU performance of the data node 2 is better, then the data node 2 may be selected to process the copy stored on the data node 2 during 10:10-10:20 AM. With respect to the I/O performance, the data node with a better I/O efficiency may be selected based on the I/O performance illustrated in FIG. 8.

In one embodiment of the present invention, if the first efficiency and the second efficiency satisfy a predefined criterion, the first copy of the data block is processed by the first data node. Usually, the time cost for processing the data block depends on the time cost for loading the copy of the data block and the time cost for processing the loaded copy. Accordingly, the criterion for comparing the first and second efficiencies may be predefined according to the specific environment of the embodiment.

Generally, the time cost for processing the data block is much higher than that for loading the data block. If so, the I/O performance index may be ignored and the CPU performance index may be used alone in selecting the data node with a better performance. In another example, if the I/O bandwidth is relatively low and thus greatly affects the total time cost, then the I/O performance index may be considered first in selecting the data node; if the I/O performance is the same, then the CPU performance indexes may be compared. Of course, it is also possible to consider both the CPU and the I/O performance indexes in selecting the data node with a better performance.

In one embodiment of the present invention, with respect to a predefined period, the duration for processing the first copy of the data block by the first data node may be estimated. Then the first copy of the data block may be processed by the first data node if the predefined period is greater than or equal to the estimated duration.

In the embodiment of the present invention, at least one data block of the data object will be processed within the predefined period. Therefore, if the predefined period is long enough for processing at least one data block, the first copy may be processed by the first data node. Otherwise, if the predefined period is not enough for processing one data block, then the length of the predefined period may be extended to a longer period before processing the first copy.

In one embodiment of the present invention, a time cost for processing a test block by the first data node may be tested first. Then the duration may be estimated based on the time cost, a size of the test block, and a size of the data block. Usually the size of the to-be-processed data block may be relatively large, and therefore it will take relatively long time to process the data block. Generally, the time for processing the data block depends on the size of the data block, performance of the data node and the processing algorithm. Accordingly, a test block with a small size may be selected from the data block for testing. The test block may be a tiny portion of the data block, for example, the test block may be 0.1% or another percentage of the data block. In one embodiment, the size may be set to a fixed value, for example, 5 Megabytes or other values.

Continuing the above example, if the size of the data block is 1 Gigabyte, then the test block may be 1 Megabyte. If the time cost for processing the test block by the first data node is 0.1 second, then the time cost for processing the whole data block may be:

$$\begin{aligned} TimeCost &= \frac{\text{size of data block}}{\text{size of test block}} \times \text{measured time cost} \\ &= \frac{1 \text{ GB}}{1 \text{ MB}} \times 0.1 = 100 \text{ seconds} \end{aligned}$$

In the distributed storage system, multiple data blocks in the data object are often stored on the same data node. If the predefined period is enough for processing another one in the multiple data blocks, then the other data block may be processed within the predefined period.

In one embodiment of the present invention, the data block may be a portion included in a data object which further includes a further data block(s). A copy of this further data block is stored on the first data node. As the first data node is identified as a powerful data node, the first data node may be directly used to process another data block comprised in the data object. At this point, the selection of the powerful data node may be omitted, in order to further reduce the time cost for processing the whole data object.

In view of the foregoing, in one embodiment, it is checked whether the remaining time after having processed the first copy is long enough for processing another data block. If the data blocks in the data object have the same size, it can be assumed that the time cost for processing the data block is identical to that for processing the other data block. In this embodiment, if a difference between the predefined period and the estimated duration is greater than or equal to the other duration, the copy of the other data block may be processed by the first data node. In one embodiment of the present invention, the above operations may be repeated until the remaining time is not long enough for processing a further data block, or all the data blocks on the first data node have been processed.

Figure 8:
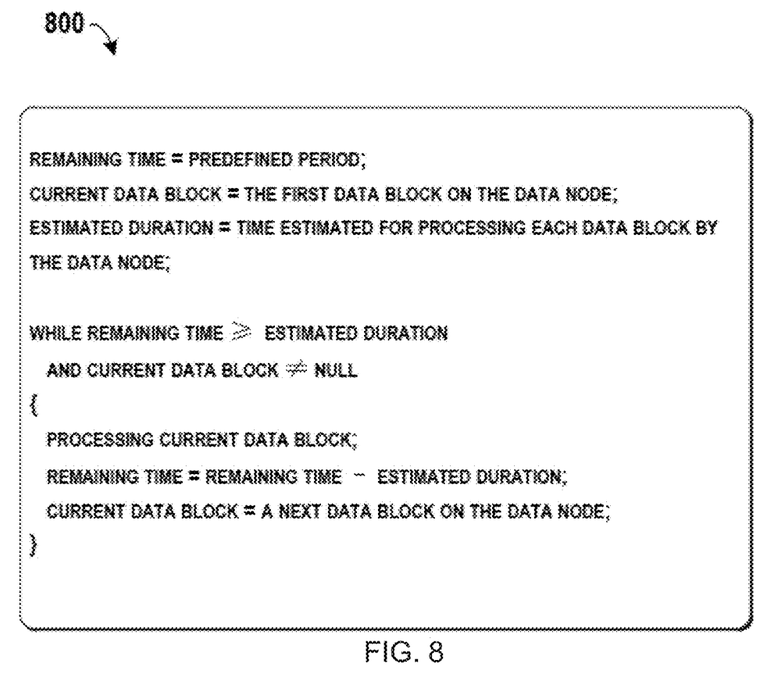
FIG. 8 illustrates a fragment of pseudo code for processing at least one data block by one data node according to one embodiment of the present invention.

FIG. 8 illustrates an example fragment of pseudo code 800 for processing at least one data block by one data node according to one embodiment of the present invention. Initially, the remaining time may be set to the predefined period. Continuing the above example, if the predefined period is 10 minutes, then the remaining time is set to 10 minutes. At the beginning, the current data block may point to a data block that is to be processed. Next, the duration for processing each data block by the data node may be estimated. As all the data blocks may have the same size, the estimated duration may be the same.

Then it is checked whether the remaining time is long enough for processing the current data block or not. The check may be performed with reference to following two example judgment criteria: (1) whether the current data block is null or not; and (2) whether the current data block may be processed within the remaining time. Additional or alternative criteria can be used as well. If the above criteria are satisfied, then the current data block is processed. Next, the estimated duration is subtracted from the remaining duration, and then the current data block points to a next to-be-processed data block stored on the data node to perform the check.

With above procedure, once the data node is identified as a powerful data node, the data node may process at least one data block stored on the data node within the predefined period. If the predefined period is 10 minutes (600 seconds), and the estimated duration for processing each data block is 60 seconds, then it is possible to process a maximum of 10 data blocks within the predefined period. It would be appreciated that in the above procedure, the number of data blocks processed within the predefined period depends on a smaller one of the number of the data blocks to be processed and the maximum number (which is 10 in this example).

It would be appreciated that the algorithm in FIG. 8 are described only for the purpose of illustration and help those skilled in the art to understand and implement the present invention, without suggesting any limitations as to the scope of the invention. Other appropriate algorithms may be adopted according to demands of specific application environment, so long as these algorithms may define suitable rules for scheduling the data processing on the data node.

For example, one rule may specify that the workload caused by processing the data block should not affect the normal operation of the data node. In one embodiment, a threshold of the performance of the data node may be defined. For example, the rule may specify that the data node may refuse to process the data node if its CPU usage is lower than a threshold such as 50%. For another example, another rule may specify that a maximum number of the data blocks to be processed within the predefined period, such that the workload for processing the whole data object may be distributed among more data nodes.

Although the above paragraphs describe processing data blocks stored on one data node by the data node, it would be appreciated that for a data object including multiple data blocks stored on multiple data nodes, while one data node is processing one data block included in the data object, another data node may process another data block also included in the data object. In other words, the processing on the two data nodes may be implemented in parallel.

In one embodiment of the present invention, the data block is a portion included in a data object which further includes another data block. It is supposed that a third copy of the other data block is stored on a third data node and a fourth copy of the other data block may be stored on a fourth data node. In some embodiments, the performance indexes of the third and the fourth data node may be determined, respectively. Then the data node with a better performance may be selected from the third and fourth data nodes for processing the other data block and obtaining a processed result of the other data block. These can be done in similar ways as described in the above paragraphs, and the details thereof are thus omitted hereinafter.

In some cases, the workloads for processing each data block included in the data object may be distributed among multiple data nodes. Considering multiple copies of one data block may be stored on multiple data nodes, one powerful data node may be selected from the multiple data nodes for processing the data block stored thereon. In scheduling the workloads, distribution of the copies of each data block and the performance index of each data node may be collected for further processing. For example, the available CPU usage and available I/O bandwidth may be used as indicators for the performance. Continuing the above example of the Hadoop® storage system, the data object comprises 100 data blocks D1, D2, . . . , D100, each data block has three copies, and the three copies of each data block are stored on the data node 1, the data node 2, . . . . Table 2 illustrates an example of the performance indexes of multiple data nodes.

TABLE 2

| | Performance Index | | | |
|---|---|---|---|---|
| Data Node ID | Available CPU Usage | Disk ID | Available I/O Bandwidth | Data Block |
| Data Node 1 | 90% | Disk 1 | 80 | D1, D3, D12, . . . |
| | | Disk 2 | 100 | D1, D2, D5, D11, . . . |
| Data Node 2 | 50% | Disk 3 | 90 | D1, D8, D10, D7, . . . |
| | | Disk 4 | . . . | |
| . . . | . . . | . . . | . . . | . . . |

With respect to the data block D1, the three copies of the data block D1 are stored on Disk 1 of the data node 1, Disk 2 of the data node 1, and Disk 3 of the data node 2, respectively. In the context of the present invention, one copy may be selected from the above three copies for further processing. In order to find a better performed data node, Table 2 may be sorted according to the available CPU usage and the available I/O bandwidth, the sorted data is illustrated in Table 3 as below.

TABLE 3

Sorted Performance Index

| Data Node ID | Available CPU Usage | Disk ID | Available I/O Bandwidth | Data Block |
|---|---|---|---|---|
| Data Node 1 | 90% | Disk 2 | 100 | D1, D2, D5, D11, . . . |
|  |  | Disk 1 | 80 | D1, D3, D12, . . . |
| Data Node 2 | 50% | Disk 3 | 90 | D1, D8, D10, D7, . . . |
|  |  | Disk 4 | . . . |  |
| . . . | . . . | . . . | . . . | . . . |

As the Available CPU Usage of the data node 1 is higher than that of the data node 2 (90%>50%), the data node 1 may be identified as the better performed data node. Further, as available I/O bandwidth of the disk 2 is higher than that of the disk 1 (100%>80%), the copy of the data block D1 on the disk 2 may be processed by the data node 1, to obtain a processed result of the data block D1.

Details of processing the data block D1 are described with reference to Tables 2 and 3 in the above paragraphs, thus other data blocks (such as D2, D3, . . . , D100) may be processed in the same way. In other words, the data blocks D1, D2, . . . , D100 may be processed on multiple data nodes in parallel within each predefined period. For example, within the predefined period, the data block D3 on the disk 1 of the data node 1 may be processed by the data node 1, and the data block D8 on the disk 3 of the data node 2 may be processed on the data node 2.

Further, if the predefined period is long enough, then at least one other data block may be processed within the predefined period. For example, if there is enough time, the data blocks D2 and D5 may be processed within the predefined period. Similarly, the data node 2 may process multiple data blocks (for example, D3 and D13) within the predefined period.

Figure 9:
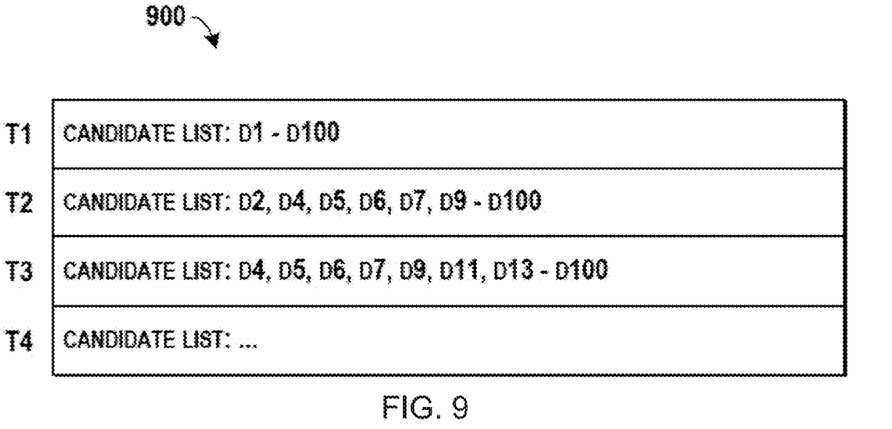
FIG. 9 illustrates candidate lists including to-be-processed data blocks at various time points according to one embodiment of the present invention.

In one embodiment of the present invention, a candidate list comprising the to-be-processed data blocks of the data object may be generated. This candidate list may be updated periodically. FIG. 9 illustrates candidate lists 900 comprising data blocks to be processed at various time points according to one embodiment of the present invention. Referring to FIG. 9, at the time point of T1, the candidate list may comprise the data blocks D1, D2, . . . , D100. During the first predefined period, the data block D1 on the disk 2 may be processed by the data node 1, the data block D3 on the disk 1 of the data node 1 may be processed by the data node 1, and the data block D8 on the disk 3 of the data node 2 may be processed by the data node 2. Accordingly, at T2 (the beginning of the second predefined period), the data blocks D1, D3 and D8 have already been processed and thus are cancelled from the candidate list. Accordingly, the candidate list at T2 may comprise D2, D4, D5, D6, D7, D9-D100.

Next, during the second predefined period, the data block D2 on the disk 2 the data node 1 may be processed by the data node 1, the data block D12 on the disk 1 the data node 1 may be processed by the data node 1, and the data block D10 on the disk 3 the data node 2 may be processed by the data node 2. Accordingly, at T3 (the end of the second predefined period), the data blocks D2, D12 and D10 have already been processed and thus are cancelled from the candidate list. Then, the candidate list at T3 may comprise D4, D5, D6, D7, D9, D11, D13-D100. In other examples, more than one data block stored on a disk of a data node may be processed by the data node within one predefined period.

In one embodiment of the present invention, processing the first copy of the data block is based on a MAP algorithm, and generating the processed result of the data object is based on a REDUCE algorithm. MapReduce is a programming model and an associated implementation for processing and generating large data sets with a parallel, distributed algorithm among multiple data nodes. The MapReduce may relate to two procedures, the MAP procedure may be implemented at each data node on which the data blocks are stored, and the REDUCE procedure may be implemented at a data node that is powerful enough for integrating the processed results of each data block into a final result of the data object.

Figure 10:
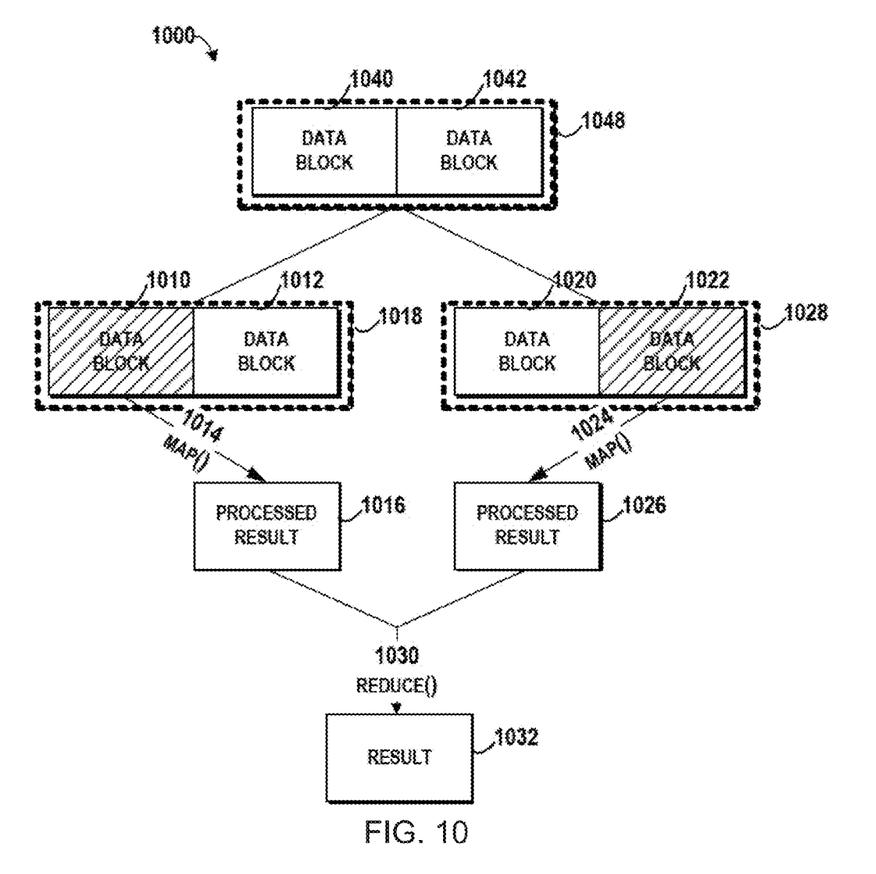
FIG. 10 illustrates a block diagram for integrating processed results of multiple data blocks into a final result according to one embodiment of the present invention.

In one embodiment of the present invention, the data block may be a portion included in a data object. At this point, a processed result of the data object may be generated at least based on the processed result of the data block. FIG. 10 schematically illustrates a block diagram for integrating processed results of multiple data blocks into a final result according to one embodiment of the present invention.

As illustrated in the environment 1000 depicted in FIG. 10, a data object 1048 includes a data block 1040 and a data block 1042, and two copies of these data object 1048 are stored on a data node 1018 and a data node 1028 respectively. The copy stored on the data node 1018 comprises a data block 1010 and a data block 1012. The copy stored on the data node 1028 comprises a data block 1020 and a data block 1022. According to the above embodiments, the data block 1010 is processed (1014) by the data node 1018 with a MAP procedure, and the data block 1022 is processed (1024) by the data node 1028 with a MAP procedure.

In FIG. 10, the processed result 1016 is obtained from a copy of the data block 1040 stored on the data node 1018, and the process result 1026 is obtained from a copy of the data block 1042 stored on the data node 1028. Although the two processed results come from different data nodes, they may be integrated into a final result 1032. As illustrated by an arrow 1030, a REDUCE procedure may be called to generate the final result 1032 from the processed result 1016 and the process result 1026.

An example searching for a maximum number in a plurality of numbers will be described to show the details of FIG. 10. In this example, the data object 1048 includes 1000 numbers and is divided into two data blocks. Each data block includes 500 numbers (for example, data block 1040 includes numbers 1-500, and data block 1042 includes numbers 501-1000). Two copies of the data block 1040 and the data block 1042 are stored on the data node 1018 and the data node 1028, respectively. For example, the data block 1010 and the data block 1020 include the numbers 1-500, and the data block 1012 and the data block 1022 include the numbers 501-1000.

In this example, after the MAP procedure illustrated by the arrows 1014 and 1024, the processed result 1016 may be the maximum of the numbers 1-500, while the process result 1026 may be the maximum of the numbers 501-1000. Next, in the REDUCE procedure as illustrated by the arrow 1030, a larger one is selected from the processed result 1016 and the process result 1026 to be the final result 1032.

It would be appreciated that the above example of searching for a maximum number is just for the purpose of illustration and help those skilled in the art to understand and implement the present invention, without suggesting any limitations as to the scope of the invention. Based on the purpose for processing the data object, one can design other algorithms in the MAP and REDUCE procedures.

In the context of the present invention, where multiple copies of the data blocks comprised in the data object are stored on multiple data nodes of the distributed storage system, the above technical solution may find a better performing data node to process a copy of a certain data block. With the embodiments of the present invention, the time cost for processing each data block included in the data object may be reduced. Meanwhile, the data blocks included in the data object may be processed by corresponding data nodes in parallel, and thus the time cost for processing the whole data object may be optimized.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. Since the apparatus/system is based on the same invention concept as the method, the same or corresponding implementation details are also applicable to means or modules corresponding to the method. As detailed and complete description has been presented above, the apparatus/system is not detailed below.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. for example, one or more units in the system may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a data block, the method comprising:
    determining, by one or more processors, a first performance index of a first data node, wherein a first copy of the data block is stored on the first data node, wherein the first copy of the data block is a portion included in a data object;
    determining, by one or more processors, a second performance index of a second data node, wherein a second copy of the data block is stored on the second data node;
    processing, by one or more processors, the first copy of the data block using a MAP algorithm in response to the first performance index being greater than, according to a predefined threshold, the second performance index, where processing the first copy of the data block using the MAP algorithm comprises:
        measuring, by one or more processors, a time cost for processing a test block by the first data node,
        estimating, by one or more processors, a duration based on the time cost, a size of the test block, and a size of the first copy of the data block, and
        in response to a predefined period being greater than or equal to the estimated duration, processing, by one or more processors, the first copy of the data block; and
    generating, by one or more processors, a processed result of the data object using a REDUCE algorithm based on, at least, the processed first copy of the data block.

2. The method of claim 1, wherein processing the first copy of the data block using the MAP algorithm comprises:
    predicting, by one or more processors, a first efficiency of the first data node within a predefined period according to the first performance index;
    predicting, by one or more processors, a second efficiency of the second data node within the predefined period according to the second performance index; and
    processing, by one or more processors, the first copy of the data block in response to the first efficiency and the second efficiency satisfying a predefined criterion.

3. The method of claim 1, wherein determining the first and second performance indexes comprises:
    collecting, by one or more processors, performance histories of the first and second data nodes, respectively; and
    generating, by one or more processors, the first and second performance indexes based on the respective performance histories of the first and second data nodes.

4. The method of claim 1, wherein the data object includes a further data block, and wherein a first copy of the further data block is stored on a third data node and a second copy of the further data block is stored on a fourth data node, the method further comprising:
    determining, by one or more processors, a third performance index of the third data node;
    determining, by one or more processors, a fourth performance index of the fourth data node; and
    processing, by one or more processors, the first copy of the further data block by the third data node in response to the third performance index being greater than, according to the predefined threshold, the fourth performance index.

5. The method of claim 1, wherein the data object includes a further data block, and wherein a copy of the further data block is stored on the first data node, the method further comprising:
    in response to the predefined period being greater than the estimated duration, estimating, by one or more processors, a further duration for causing, by one or more processors, the first data node to process the copy of the further data block; and
    in response to a difference between the predefined period and the estimated duration being greater than or equal to the further duration, causing, by one or more processors, the first data node to process the copy of the further data block.

6. A computer program product for processing a data block, the computer program product comprising:

one or more computer readable storage media and program instructions stored on the one or more computer readable storage media, the program instructions comprising:
- program instructions to determine a first performance index of a first data node, wherein a first copy of the data block is stored on the first data node, wherein the first copy of the data block is a portion included in a data object;
- program instructions to determine a second performance index of a second data node, wherein a second copy of the data block is stored on the second data node;
- program instructions to process the first copy of the data block using a MAP algorithm in response to the first performance index being greater than, according to a predefined threshold, the second performance index, where the program instructions to process the first copy of the data block using the MAP algorithm comprise:
  - program instructions to measure a time cost for processing a test block by the first data node,
  - program instructions to estimate a duration based on the time cost, a size of the test block, and a size of the first copy of the data block, and
  - in response to a predefined period being greater than or equal to the estimated duration, program instructions to process the first copy of the data block; and
- program instructions to generate a processed result of the data object using a REDUCE algorithm based on, at least, the processed first copy of the data block.

7. The computer program product of claim 6, wherein program instructions to process the first copy of the data block using the MAP algorithm comprise:
- program instructions to predict a first efficiency of the first data node within a predefined period according to the first performance index;
- program instructions to predict a second efficiency of the second data node within the predefined period according to the second performance index; and
- program instructions to process the first copy of the data block in response to the first efficiency and the second efficiency satisfying a predefined criterion.

8. The computer program product of claim 6, wherein program instructions to determine the first and second performance indexes comprise:
- program instructions to collect performance histories of the first and second data nodes, respectively; and
- program instructions to generate the first and second performance indexes based on the respective performance histories of the first and second data nodes.

9. The computer program product of claim 6, wherein the data object includes a further data block, and wherein a first copy of the further data block is stored on a third data node and a second copy of the further data block is stored on a fourth data node, the computer program product further comprising:
- program instructions, stored one the one or more computer readable storage media, to determine a third performance index of the third data node;
- program instructions, stored one the one or more computer readable storage media, to determine a fourth performance index of the fourth data node; and
- program instructions, stored one the one or more computer readable storage media, to process the first copy of the further data block by the third data node in response to the third performance index being greater than, according to the predefined threshold, the fourth performance index.

10. The computer program product of claim 6, wherein the data object includes a further data block, and wherein a copy of the further data block is stored on the first data node, the computer program product further comprising:
- program instructions, stored one the one or more computer readable storage media, to, in response to the predefined period being greater than the estimated duration, estimate a further duration for causing, by one or more processors, the first data node to process the copy of the further data block; and
- program instructions, stored one the one or more computer readable storage media, to, in response to a difference between the predefined period and the estimated duration being greater than or equal to the further duration, cause the first data node to process the copy of the further data block.

11. A computer system for processing a data block, the computer system comprising:
one or more computer processors, one or more computer readable storage media, and program instructions stored on the computer readable storage media for execution by at least one of the one or more processors, the program instructions comprising:
- program instructions to determine a first performance index of a first data node, wherein a first copy of the data block is stored on the first data node, wherein the first copy of the data block is a portion included in a data object;
- program instructions to determine a second performance index of a second data node, wherein a second copy of the data block is stored on the second data node;
- program instructions to process the first copy of the data block using a MAP algorithm in response to the first performance index being greater than, according to a predefined threshold, the second performance index, where the program instructions to process the first copy of the data block using the MAP algorithm comprise:
  - program instructions to measure a time cost for processing a test block by the first data node,
  - program instructions to estimate a duration based on the time cost, a size of the test block, and a size of the first copy of the data block, and
  - in response to a predefined period being greater than or equal to the estimated duration, program instructions to process the first copy of the data block; and
- program instructions to generate a processed result of the data object using a REDUCE algorithm based on, at least, the processed first copy of the data block.

12. The computer system of claim 11, wherein program instructions to process the first copy of the data block using the MAP algorithm comprise:
- program instructions to predict a first efficiency of the first data node within a predefined period according to the first performance index;
- program instructions to predict a second efficiency of the second data node within the predefined period according to the second performance index; and
- program instructions to process the first copy of the data block in response to the first efficiency and the second efficiency satisfying a predefined criterion.

13. The computer system of claim 11, wherein program instructions to determine the first and second performance indexes comprise:
- program instructions to collect performance histories of the first and second data nodes, respectively; and
- program instructions to generate the first and second performance indexes based on the respective performance histories of the first and second data nodes.

14. The computer system of claim 11, wherein the data object includes a further data block, and wherein a first copy of the further data block is stored on a third data node and a second copy of the further data block is stored on a fourth data node, the computer system further comprising:
- program instructions, stored one the one or more computer readable storage media for execution by at least one of the one or more processors, to determine a third performance index of the third data node;
- program instructions, stored one the one or more computer readable storage media for execution by at least one of the one or more processors, to determine a fourth performance index of the fourth data node; and
- program instructions, stored one the one or more computer readable storage media for execution by at least one of the one or more processors, to process the first copy of the further data block by the third data node in response to the third performance index being greater than, according to the predefined threshold, the fourth performance index.

* * * * *